US012251672B1

(12) United States Patent
Mazzei et al.

(10) Patent No.: US 12,251,672 B1
(45) Date of Patent: Mar. 18, 2025

(54) CHEMICAL MIXING SPOOL AND METHOD

(71) Applicant: Mazzei Injector Company, LLC, Bakersfield, CA (US)

(72) Inventors: Angelo L. Mazzei, Bakersfield, CA (US); Erich DeLang, Rockford, IL (US); Saumya Dholakia, Bakersfield, CA (US); Michael Spillner, Marina Del Ray, CA (US)

(73) Assignee: Mazzei Injector Company LLC, Bakersfield, CA (US)

( * ) Notice: Subject to any disclaimer, the term of this patent is extended or adjusted under 35 U.S.C. 154(b) by 0 days.

(21) Appl. No.: 18/933,918

(22) Filed: Oct. 31, 2024

Related U.S. Application Data

(63) Continuation-in-part of application No. 18/595,126, filed on Mar. 4, 2024.

(51) Int. Cl.
*B01F 23/451* (2022.01)
*B01F 25/21* (2022.01)
*B01F 25/23* (2022.01)
*B01F 25/27* (2022.01)
*B01F 25/313* (2022.01)
*B01F 25/431* (2022.01)
*C02F 1/52* (2023.01)
*C02F 1/68* (2023.01)
*B01F 101/00* (2022.01)

(52) U.S. Cl.
CPC ........ *B01F 25/3131* (2022.01); *B01F 23/451* (2022.01); *B01F 25/21* (2022.01); *B01F 25/23* (2022.01); *B01F 25/27* (2022.01); *B01F 25/3133* (2022.01); *B01F 25/43171* (2022.01); *B01F 25/431971* (2022.01); *C02F 1/5281* (2013.01); *C02F 1/686* (2013.01); *B01F 2101/305* (2022.01); *B01F 2215/0422* (2013.01); *B01F 2215/0427* (2013.01); *B01F 2215/0431* (2013.01); *B01F 2215/045* (2013.01); *B01F 2215/0459* (2013.01); *B01F 2215/0468* (2013.01)

(58) Field of Classification Search
CPC .............................. B01F 23/451; B01F 25/23
USPC ...................................................... 366/162.4
See application file for complete search history.

(56) References Cited

U.S. PATENT DOCUMENTS

| | | | | |
|---|---|---|---|---|
| 3,666,663 A | * | 5/1972 | Walker ................ | B01F 25/3131 366/173.2 |
| 4,147,657 A | * | 4/1979 | Kovanda ............... | B01F 25/311 422/232 |
| 4,869,595 A | * | 9/1989 | Lang ................. | B01F 25/31331 366/173.1 |
| 5,183,335 A | * | 2/1993 | Lang ..................... | B01F 25/313 366/175.2 |

(Continued)

*Primary Examiner* — David L Sorkin
(74) *Attorney, Agent, or Firm* — James M. Duncan; Scanlon Duncan LLP

(57) ABSTRACT

A mixing spool is utilized to mix a liquid coagulant into water flowing through a large conduit. The mixing spool is inserted as a segment into the conduit. The mixing spool utilizes a pair of opposite facing nozzles which extend through a wall of the spool into the interior of the spool. The nozzles receive a pressurized liquid flow through a manifold. A chemical injection quill has an open end positioned between the opposite facing nozzles, wherein the chemical injection quill is configured to deliver the liquid coagulant into the water flowing through the conduit.

20 Claims, 9 Drawing Sheets

(56) References Cited

U.S. PATENT DOCUMENTS

| | | | | |
|---|---|---|---|---|
| 6,422,735 B1* | 7/2002 | Lang | ............... | B01F 23/453 |
| | | | | 366/175.2 |
| 6,596,176 B1* | 7/2003 | Delozier, II | ............ | C02F 1/722 |
| | | | | 210/732 |
| 9,931,602 B1* | 4/2018 | Mazzei | ............... | B01F 25/3141 |
| 2009/0056812 A1* | 3/2009 | Mazzei | ............... | B01F 23/2323 |
| | | | | 137/7 |
| 2014/0083952 A1* | 3/2014 | Mazzei | ............... | B01F 25/3121 |
| | | | | 210/749 |
| 2018/0065871 A1* | 3/2018 | Wright | ............... | B01F 25/23 |

* cited by examiner

CHEMICAL MIXING SPOOL AND METHOD

BACKGROUND

The present invention generally relates to flow of liquids through large conduits. The present invention is more specifically directed to an apparatus and method which provides for an injection of a liquid additive into a liquid flowing through a large conduit resulting in a homogenous mixture which is rapidly achieved.

Some industrial applications, including water and wastewater treatment, chemical processing, food processing, paper production, and the like, require the mixing of liquids within a flowing conduit to achieve a desired result. The known devices for mixing a solute into a flowing solvent and creating a solution within a conduit are generally categorized as having a static mixer design. The static mixer design typically utilizes stationary elements, such as baffles or blades within a pipe or tube which create turbulence and enhance mixing.

Depending upon the application, it may be desirable to rapidly achieve highly effective mixing—i.e., a high uniformity index ("UI")—very quickly. The higher the value of the uniformity index the better the mixing effectiveness, with a uniformity index value of 1.00 equating to a perfectly homogenous solution. Some chemical additives require immediate mixing to be effective. In addition, rapid mixing can reduce the chemical additive required for a particular application. The required level of mixing and the time required to achieve the required mixing is process specific, with some processes requiring rapid mixing in a very short time.

The mixing process may be further complicated in cases where it is desirable to obtain a high-quality mixture where a relatively small volume of additive is mixed with a large volume of liquid flowing through a large conduit. For example, a conduit having a diameter ranging from 16 inches to 94 inches in diameter having a flow velocity ranging from 0.5 ft/sec. to 9.0 ft/sec. For some applications, such as water treatment facilities utilized by municipalities and industries, a mixing apparatus and method which are capable of rapidly achieving a high-quality mixture for a liquid additive provided into a liquid flow in a large diameter conduit is desired.

SUMMARY OF THE INVENTION

Embodiments of the presently disclosed apparatus and method address the need identified above. Specifically, the apparatus and method address the problem of efficiently mixing very small volumes of coagulant into very large bulk water flows in municipal drinking water treatment plants. The goal of the apparatus and method is to establish the mixing rapidly, at relatively low energy cost, and with minimal pressure drop across the mixing apparatus. The above discussion suggests four metrics which were considered by the inventors herein in the conception of the disclosed apparatus and method: (1) a small volume of chemical additive mixed into a very large flow of water; (2) rapid mixing; (3) low energy requirements; and (4) minimal pressure drop across the device.

The first metric—small volume of chemical additive mixed into a very large flow of water—has become important because of the development of novel and enhanced coagulants and polymers for water treatment. These developments have resulted in a decrease in the optimal volumetric ratio of coagulant chemical to bulk water flow. Unfortunately, the development of improvements in the additives has outpaced the development of technologies to efficiently blend those additives into the water supply. Efficiently mixing a smaller volume into a larger volume is more difficult than mixing when the two elements are closer in proportion to one another. For this reason, the inability to efficiently blend the new generation of additives into the water flow has resulted in a need to overfeed chemical in order to overcome suboptimal mixing. Embodiments of the present apparatus and method were designed for a chemical injection rate where the solute (i.e, the treatment chemical injection rate) comprises 0.01 percent or less of the solvent (i.e., the bulk water flow rate).

The second metric is directed toward the mixing of the extremely volumetrically unbalanced solute and solvent rapidly. Many coagulants are of what's referred to as a "pre-hydrolyzed" variety, which is to say that the chemical itself is already in its most active state when supplied to the drinking water treatment plants. There are however traditional, highly effective coagulants such as ferric chloride and aluminum chloride that are not pre-hydrolyzed. Upon contact with water, these coagulants undergo hydrolysis that transitions them into different compounds that react with suspended organics in the water to form flocs with greater density than the surrounding medium and will settle given proper time and the quiescent conditions necessary to do so. While the final compounds are themselves effective coagulants, the most effective compounds are the intermediate species that are inherently unstable, formed and consumed within a second of contact with water. Taking full advantage of the effectiveness of these compounds requires that they form simultaneously across the bulk water flow, requiring that the chemical be dispersed extremely rapidly.

The third metric is directed toward minimizing the amount of energy output required to achieve the mixing; otherwise savings realized from avoiding excess chemical usage would be at the expense of additional energy required to achieve the mixing.

The final design metric is to achieve the mixing with minimal pressure drop across the device, with the goal of achieving the desired uniformity at the stated energy cost in the stated amount of time and doing so while minimizing the pressure drop across the bulk flow. Many drinking water treatment plants have an extremely tight hydraulic grade. Most water flow through a treatment plant is the result of gravity flow, where the water flows through the treatment process via inclined channels and pipes, minimizing the need for pumping and the ensuing energy and maintenance costs. The disadvantage of this approach is that any device which produces a significant pressure drop across itself acts effectively as an incline, slowing and, in the worst case, entirely stopping the gravity flow through a plant. Most static mixing devices achieve mixing by converting the kinetic energy of the roughly laminar flowing water into turbulent kinetic energy by "turning" the water flow back on itself using specifically designed geometry with the device, but the conversion of laminar flow to turbulent flow results in a significant pressure drop, often several pounds per square inch. In contrast, embodiments of the present apparatus and method provide a pressure drop which is substantially lower than achievable with static mixing devices.

Embodiments of the presently disclosed mixing apparatus are inserted as spool pieces (or piping segments) into large diameter conduits (i.e., having an outside diameter ranging from 16 inches to 94 inches). An embodiment of the apparatus has a length extending between an upstream end and a downstream end, which ends will typically be flanges but other known connection devices may also be utilized.

The spool piece has an integral conduit portion having a wall thickness which will be compatible with the pressure and service requirements of the particular application and comparable with the large diameter conduit used in the application. The wall thickness of the integral conduit portion extends from an exterior wall to an interior wall.

A first manifold and a second manifold may be configured about the exterior of the integral conduit portion of the spool piece, where the first manifold has a first manifold nozzle and the second manifold has a second manifold nozzle. The first manifold comprises a piping segment connected on one end to an inlet and connected on the other end to the first manifold nozzle. Likewise, the second manifold comprises a piping segment connected on one end to the inlet and connected on the other end to the second manifold nozzle. The inlet is configured to receive a flow of liquid which may be diverted from the conduit or which may come from an independent liquid source. The flow of liquid enters the inlet and is divided between the piping segments to flow through the first manifold nozzle and the second manifold nozzle, where the nozzles are configured to flow into the interior of the spool piece.

The first manifold nozzle has a distal end which extends through the inside wall and into the interior of the spool piece. Likewise, the second manifold nozzle has a distal end which extends through the inside wall and into the interior of the spool piece. The distal end of the first manifold nozzle and the distal end of the second manifold nozzle are disposed diametrically opposed across the diameter of the spool piece at a first axial position along the length of the spool piece, such that the first manifold nozzle and the second manifold nozzle provide opposing flows of liquid into the interior of the spool piece.

The spool piece further comprises a chemical injection quill which has an end that extends through the inside wall of the integral conduit portion of the spool piece into the flowing liquid, with the end disposed at a position between the distal ends of the first manifold nozzle and the second manifold nozzle. The chemical injection quill is configured to deliver a chemical into the injection spool at an injection point adjacent the first axial position.

Some embodiments of the apparatus may further comprise a plurality of flow vanes which are disposed in a circumferential configuration about the inside wall of the integral conduit portion of the pipe spool, including an embodiment having a plurality of trailing flow vanes which are disposed downstream of the first axial position. A variety of different flow vane configurations may be utilized in the embodiments of the apparatus. For example, a configuration of the apparatus may have six flow vanes, with each flow vane having a base attached to the inside wall of the integral conduit portion, with each base attached at a sixty-degree circumferential interval from an adjacent base.

The inventors herein have conducted extensive modeling to ascertain the UIs for various embodiments of the mixing spool. For example:

A mixing spool having a length of 46 inches set within a 42 inch diameter conduit having a liquid flow velocity of 4.6 feet/second, with a total flow of 1040 gallons/min. into the first manifold through two nozzles (i.e., 520 gal/min/nozzle) having an orifice diameter of 2.5 inches and a chemical dosage of 9 gal/hour at a concentration of 10 milligrams/liter through a chemical injection quill set a distance of 11.5 inches from the upstream end of the mixing spool, with the mixing spool including six flow vanes, the modeled uniformity index at a distance of 1 pipe diameter from the injection point was 0.78 with the UI improving to 0.94 at a distance of 5 pipe diameters from the injection point. Further modeling analysis of this embodiment has shown that under the above specified parameters, at a time of 3.0 seconds after the time of introduction of the chemical into the injection quill, the uniformity index at a downstream distance of 3-4 pipe diameters has shown a modeled uniformity index ranging from 0.85 to 0.95 with an incremental pressure drop resulting from the placement of the mixing spool in the conduit not exceeding 0.50 psig. The phrase "incremental pressure drop" as used herein refers to the difference in pressure drop in the conduit without the mixing spool in place and with the mixing spool in place.

A mixing spool having a length of 60 inches set within a 42 inch diameter conduit having a liquid flow velocity of 4.6 feet/second, with a total flow of 1040 gallons/min. through four nozzles (i.e., 260 gallons/min/nozzle) where the nozzles are configured as a first manifold having two nozzles each having an orifice diameter of 1.8 inches and a second manifold having two nozzles each having an orifice diameter of 1.8 inches, a chemical dosage of 9 gal/hour at a concentration of 10 milligrams/liter through a chemical injection quill set a distance of 11.5 inches from the upstream end of the mixing spool, with the mixing spool including six flow vanes, the modeled uniformity index at a distance of 1 pipe diameter from the injection point was 0.88, with the UI improving to 0.96 at a distance of 5 pipe diameters from the injection point. Further modeling analysis of this embodiment has shown that under the above specified parameters, at a time of 3.0 seconds after the time of introduction of the chemical into the injection quill, the uniformity index at a downstream distance of 3-4 pipe diameters has shown a modeled uniformity index ranging from 0.70 to 0.90 with a pressure drop in the conduit not exceeding 0.25 psig.

DETAILED DESCRIPTION OF THE INVENTION

Figure 1:
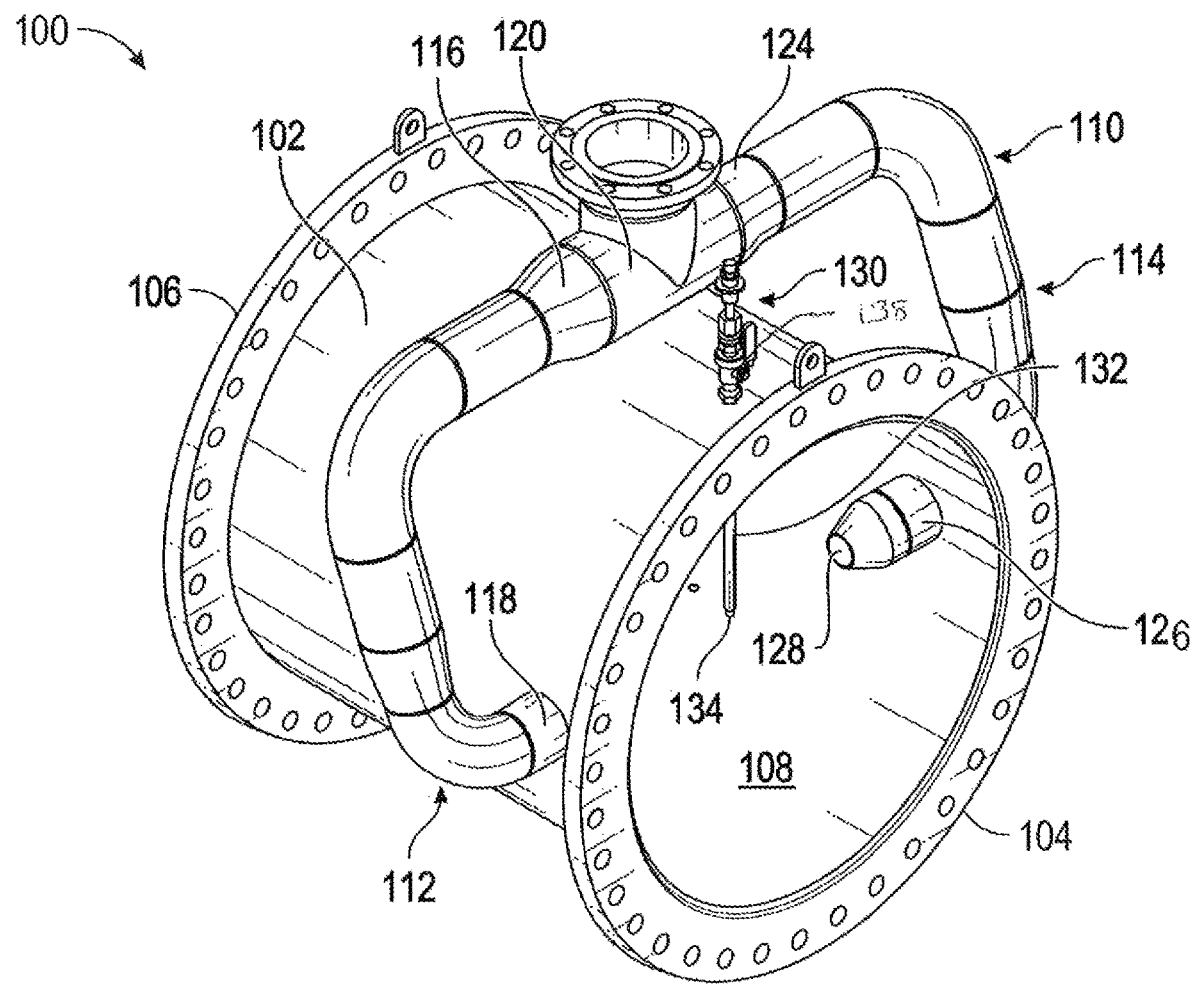
FIG. 1 depicts a perspective view of an embodiment of the presently disclosed mixing spool.
Figure 2:
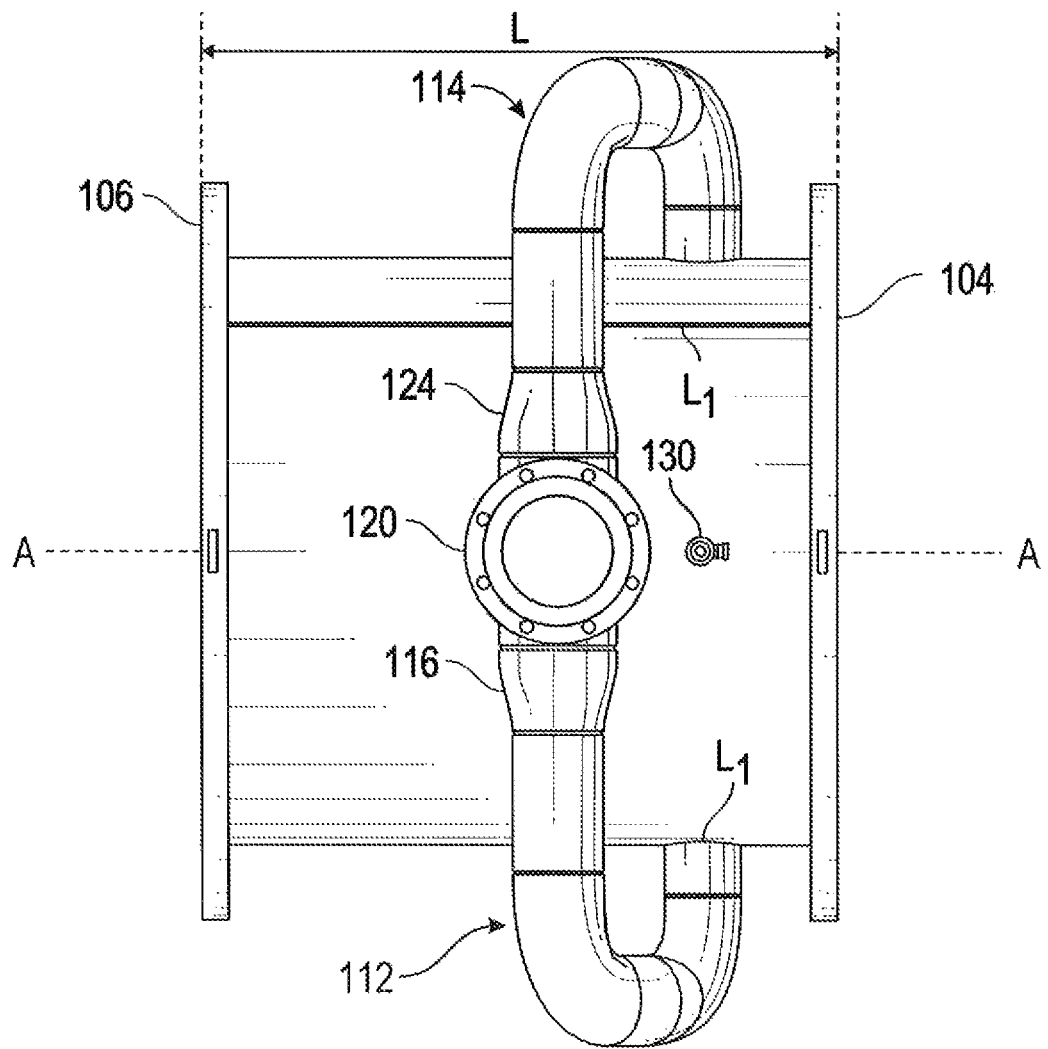
FIG. 2 depict a top view of the embodiment depicted in FIG. 1.
Figure 3:
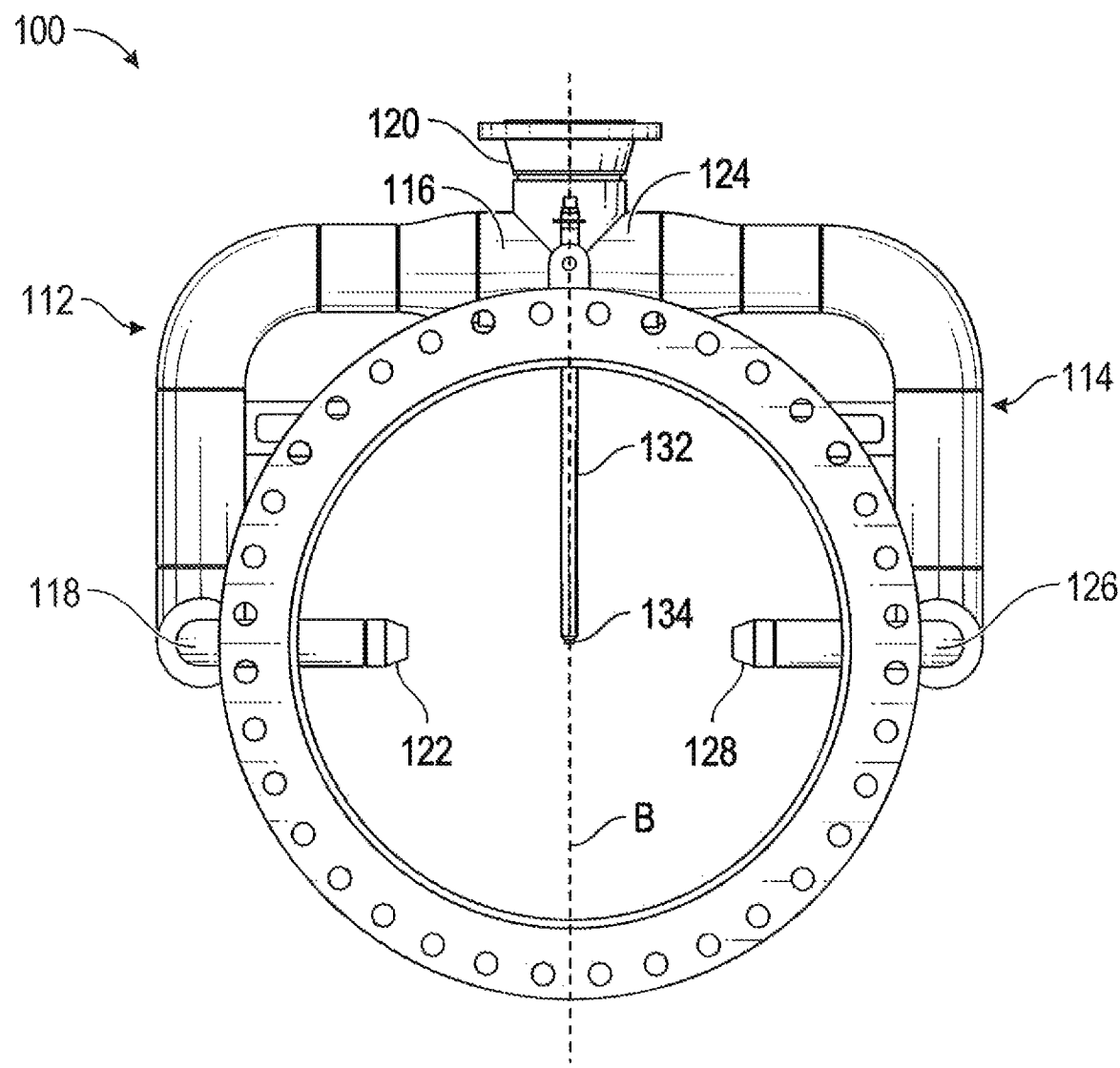
FIG. 3 depicts a view of the inlet end of the embodiment depicted in FIG. 1.

Referring now to the drawings, FIGS. 1-3 depict an embodiment of a mixing spool 100 disclosed herein. Mixing spool 100 is inserted as a piping segment into a large diameter conduit (i.e., 16-94 inches in diameter) in use for large liquid flow applications, such as industrial and municipal water treatment facilities, typically operating in full, or near full, pipe flow conditions. Mixing spool 100 has an integral conduit portion 102 which has a length L extending from an upstream end 104 to a downstream end 106, each end having a connecting structure, such as the flanges shown in the drawings, for connecting to adjacent conduit sections on either side. The integral conduit portion 102 has an inside wall 108. Materials used in fabricating mixing spool 100 will be compatible with the conduit and the particular application and inside wall 108 have an internal coating consistent with any coating in the conduit.

Mixing spool 100 also comprises a piping structure which is external to the integral conduit portion 102. This piping structure comprises a manifold assembly 110. As shown in the figures, manifold assembly 110 may comprise a first manifold 112 and a second manifold 114. The first manifold 112 has a proximate end 116 and a distal end 118. A central axis A is defined as a line extending through a center of the integral conduit portion 102. Proximate end 116 is connected to an inlet structure, such as tee 120. Distal end 118 penetrates through inside wall 108 of the integral conduit portion 102. Distal end 118 comprises a nozzle 122 which is disposed within an interior of the integral conduit portion 102.

Similar to the first manifold 112, the second manifold 114 has a proximate end 124 and a distal end 126. Proximate end 124 is connected to the inlet structure, tee 120. Distal end 126 penetrates through inside wall 108 of the integral conduit portion 102. Distal end 126 comprises a nozzle 128 also disposed within the interior of the integral conduit portion 102. Nozzle 128 is disposed to be diametrically opposite nozzle 122.

The mixing efficiency of embodiments of the mixing spool 100 is impacted by the radial penetration of nozzle 122 and nozzle 128 into the interior of the integral conduit portion. Applying a liquid mixing model, the inventors have determined that an acceptable range of radial penetration of the nozzle 122 at distal end 118 and nozzle 128 at distal end 126 is a distance equivalent to 10 percent to 25 percent of the outside diameter of the piping conduit.

Nozzle 122 and nozzle 128 are disposed at a first axial position $L_1$ along the length L of the integral conduit portion 102, with the nozzles set diametrically opposite each other. The inlet structure, tee 120, is configured to receive a pressurized liquid flow and direct the flow to first manifold 112 and second manifold 114, each through which the flow is respectively directed to nozzle 122 and nozzle 128. Nozzles 122, 128 may have an orifice diameter ranging between 1 inch to 5 inches. The pressurized liquid flow may be taken as a diversion stream from an upstream location of the large diameter conduit. It is noted that the diameter of the orifices is highly application specific and it is often directly proportional to the flow rate through the main conduit, as the orifice diameter may be customized to provide a target velocity and thrust for a typical side stream flow comprising approximately 5 percent of the flow rate through the main conduit.

Mixing spool 100 further comprises a chemical injection quill 130. Chemical injection quill 130 has a shaft 132 which extends which extends through inside wall 108 of the integral conduit portion 102 which terminates at open end 134, through which a liquid additive may be released into the interior of the mixing spool 100. The anticipated liquid additives to be released through chemical injection quill 130 include coagulants, polymers and flocculants (including pre-hydrolyzed and hydrolyzing coagulants) to be utilized for the treatment of a large volume of water flowing through a large diameter conduit. The development of novel and enhanced coagulants and polymers for water treatment has resulted in the decrease in the optimal volumetric ratio of coagulant chemical to bulk water flow. With the prior art chemical mixing devices, the improvements in the additives have exceeded the capacity of the devices to efficiently blend the new additives into the water supply, because efficiently mixing a smaller volume into a larger volume is more difficult than mixing when the two elements are closer in proportion to one another. The specific case that the current invention was designed is the introduction of 0.075 gallons per minute (4.5 gallons per hour) of concentrated coagulant into a bulk water flow of 23,611 gallons per minute (34 million gallons per day), resulting in the solute being 0.0003% of the solvent. This ratio can of course be increased, as is standard practice, but the purpose of the present invention is to offer efficient mixing even in these extreme conditions. Therefore, it is to be appreciated that embodiments of the present invention are effective where the solute comprises a range of 0.0003% to 0.01% of the solvent.

The inventors herein have determined that a satisfactory chemical injection quill 130 may be selected from the series FL-100 retractable injection quills available under the SAF-T-FLO brand name. Given the coagulating nature of the liquid additives to be released into the interior of the mixing spool 100, a retractable chemical injection quill 130 provides the ability to withdraw shaft 132 from the interior of the integral conduit section 102 to perform maintenance on the device to prevent or resolve clogging in the shaft 132. Chemical injection quill 130 has an exterior portion 136 disposed adjacent to the exterior of the integral conduit portion 102 of mixing spool 100. Exterior portion 136 comprises a ball valve 138 through which shaft 132 extends in normal operation and a packing nut 140 above the ball valve. When it is desired to withdraw the shaft 132, the withdrawal of the shaft is limited by chains or other mechanism to allow open end 134 to be withdrawn above ball valve 138 but which prevent the withdrawal of the open end above the seal of the packing nut 140. Once the shaft 132 has been sufficiently raised to clear ball valve 138, with the seal of the packing nut sealing around the shaft 132, ball valve 138 may be closed at which point packing nut 140 may be loosened and shaft 132 may be fully retracted from the injection quill 130 and serviced as necessary. Shaft 132 may be reinserted through ball valve 138 by inserting shaft 132 back into the packing nut 140, tightening the packing nut to prevent flow around shaft 132, opening ball valve 138 and extending shaft 132 through ball valve 138 and placing open end 134 at the desired position within the interior of the integral conduit portion 102.

Open end 134 of chemical injection quill 130 is configured to be placed in the interior of the integral conduit portion 102 at a position between nozzle 122 and nozzle 128, where "between" is defined as being generally equidistant from the end of nozzle 122 and the end of nozzle 128 (i.e., shaft 132 having an axis B which is perpendicular with center axis A of integral conduit portion 102). However, the radial position of open end 134 into the interior of the integral conduit portion 102 may vary. In addition, the axial position of open end 134 along length L may vary and may include a position at the same axial position, $L_1$, as nozzle 122 and nozzle 128, as well as positions downstream (i.e. toward downstream end 106) of $L_1$ including a position where open end 134 is at a downstream distance of ten percent to 15 percent of the outside diameter from axial position $L_1$.

Figure 4:
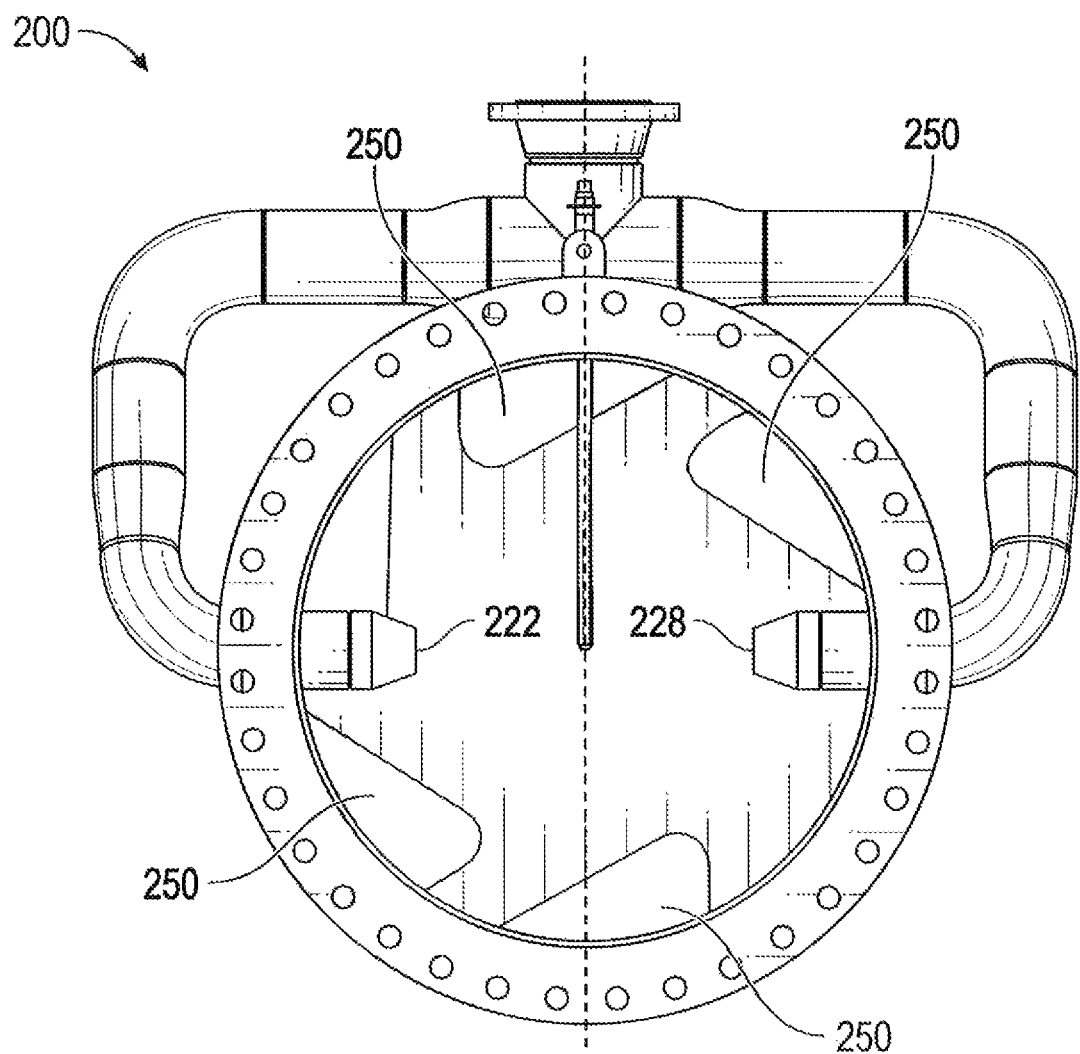
FIG. 4 depicts a view of an inlet end of an embodiment of the presently disclosed mixing spool where the embodiment includes a plurality of mixing vanes.
Figure 5:
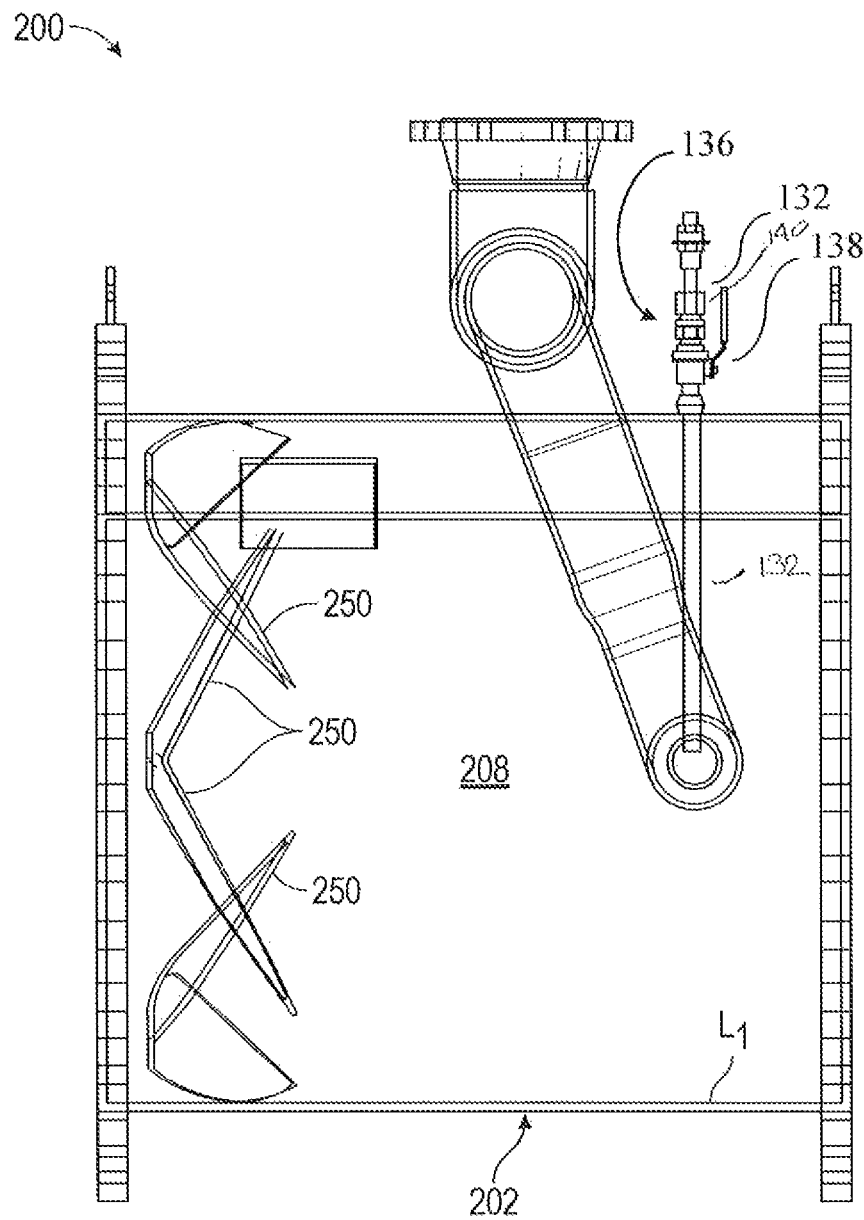
FIG. 5 depicts a side view of the embodiment of the mixing spool depicted in FIG. 4.

As depicted in FIGS. 4-5, an embodiment of the mixing spool 200 may comprise a plurality of flow vanes 250 in addition to the other structural features discussed above and depicted in FIGS. 1-3. The flow vanes 250 will typically be "trailing" in the sense the structures are disposed downstream of nozzle 222 and nozzle 228 disposed at a first axial position $L_1$. Through the modeling utilized by the inventors herein, the number, shape and location of flow vanes 250 has been found to impact the mixing efficiency.

Among other acceptable combinations, the inventors herein have discovered that six flow vanes 250 disposed circumferentially at sixty-degree intervals about the inside wall 208 of integral conduit portion 202 provides effective mixing. However, the number and orientation of vanes may vary and may include an embodiment having twelve flow vanes. The vanes may be positioned within the mixing spool 200 to be almost orthogonal to flow, which produces excellent mixing but at a substantial cost in pressure drop. Alternatively, the vanes may be oriented to be near parallel to the flow direction which produces some mixing but very little pressure drop.

Figure 7:
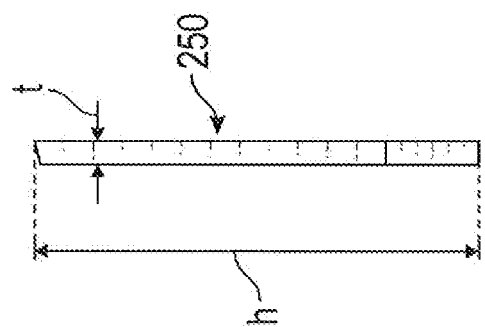
FIG. 7 depicts an elevation view of the mixing vane depicted in FIG. 6.
Figure 6:
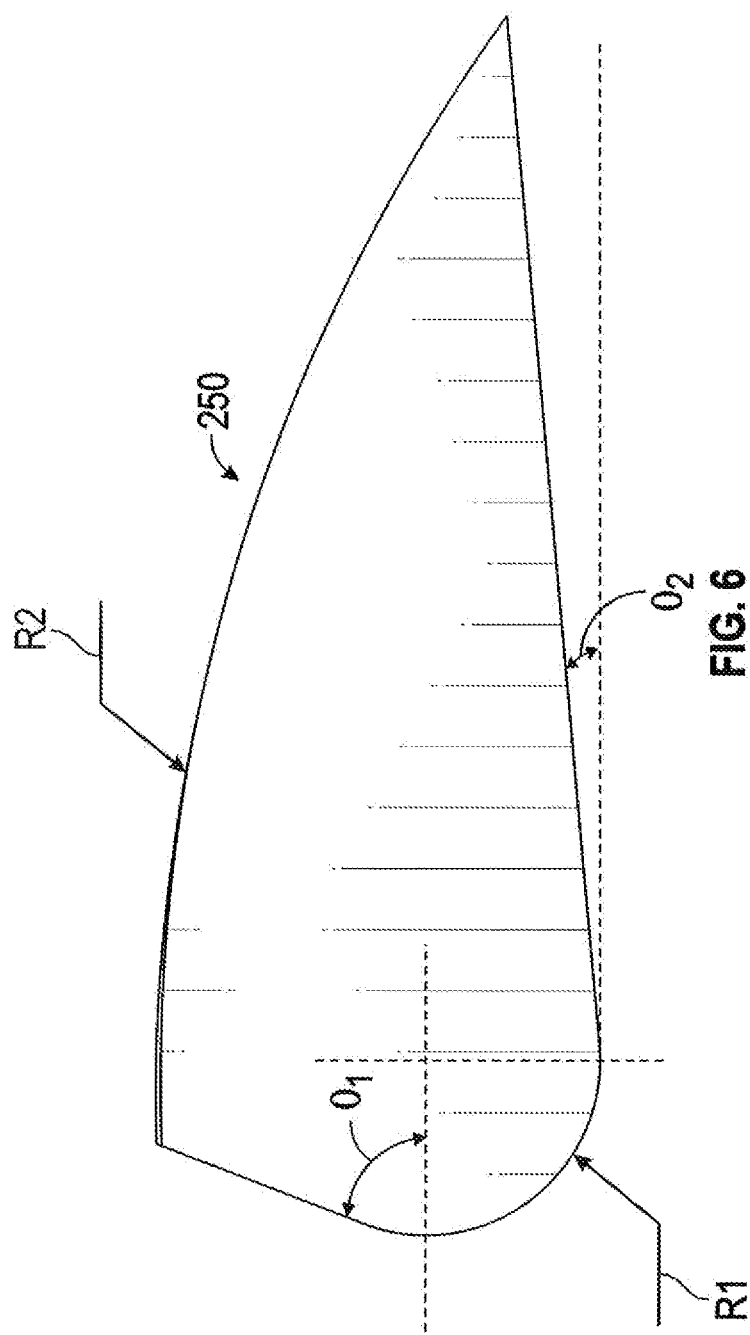
FIG. 6 depicts a side view of an embodiment of a mixing vane which may be utilized in embodiments of the mixing spool.

FIGS. 6 and 7 depict views of an embodiment of a flow vane 250 which may be utilized in embodiments of the mixing spool 200. The inventors herein have determined that the orientation of the vane 250 is the dominant factor which impacts mixing efficiency. As shown in FIG. 6, each flow vane 250 may have a shape defined by radii of curvature $R_1$ and $R_2$ and angles $\theta_1$ and $\theta_2$. For different mixing spools 200, the values for radii of curvature $R_1$ and $R_2$ and angles $\theta_1$ and $\theta_2$ may be toggled to maximize the surface area (i.e, the "wetted perimeter") of the flow vanes. In modeling mixing efficiencies, the inventors have determined that $R_1$ may range from one to five inches, where a value of 2.6 inches has been utilized for most of the modeling. $R_2$ is the point of attachment to the curved inside wall 208 of the pipe, and thus will be dependent on both the diameter of the integral conduit portion and the angle of attachment. Angle $\theta_1$ may range from 60-120° as measured from the horizontal and angle $\theta_2$ may range from 0-30° as measured from the horizontal axis.

FIG. 7 depicts a side view of the vane 250 having a rectangular configuration which extends radially into the interior of the mixing spool 200. A device may include an integral conduit portion having a length extending between an upstream end and a downstream end, the integral conduit portion comprising an inside wall. The flow vanes 250 may be fabricated from sheet metal which, if used, may control the design parameters to maintain a uniform wall thickness t as indicated in FIG. 7.

Figure 8:
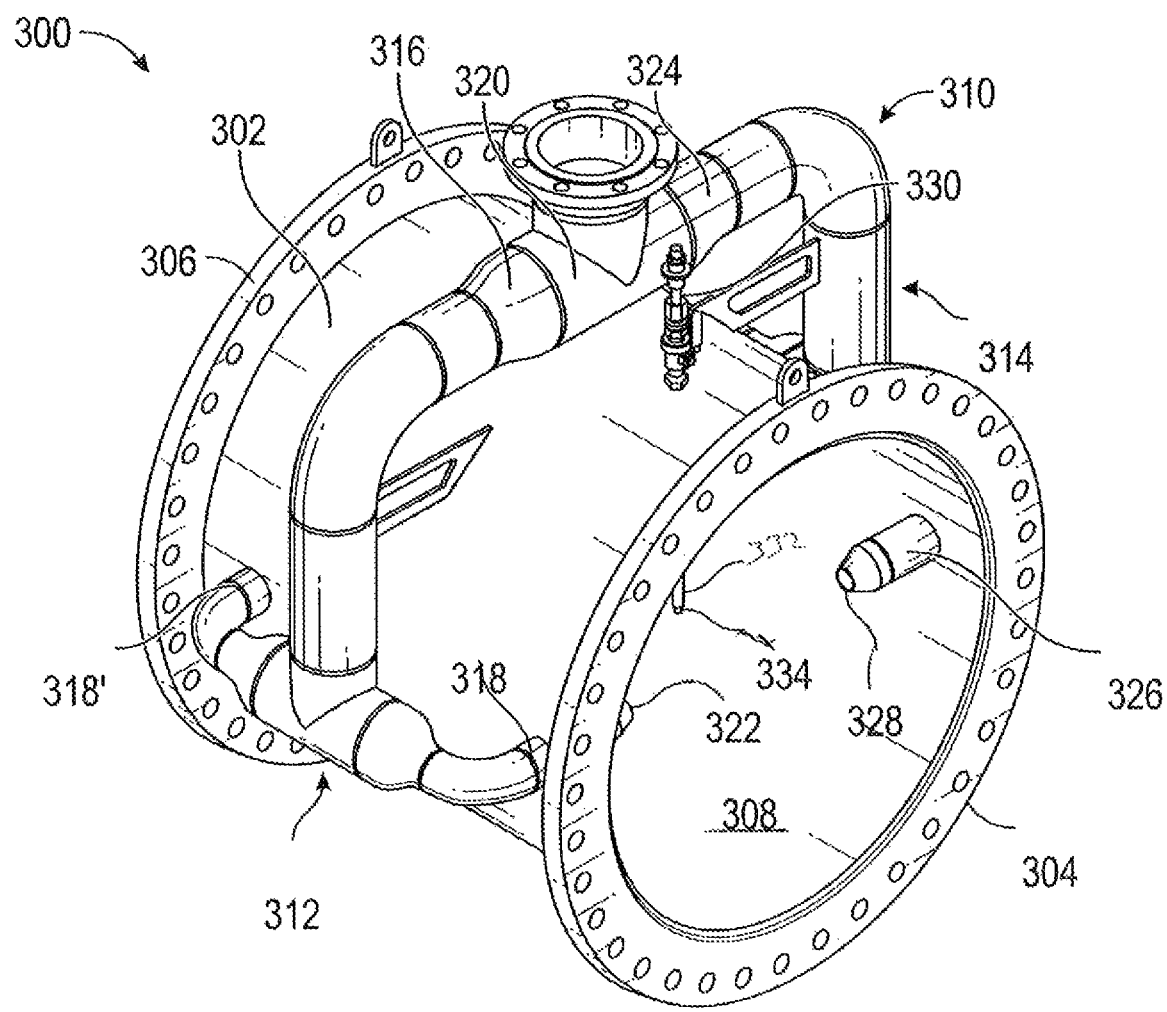
FIG. 8 depicts a perspective view of an embodiment of the presently disclosed mixing spool having a pair of nozzles disposed on each side of the mixing spool.
Figure 9:
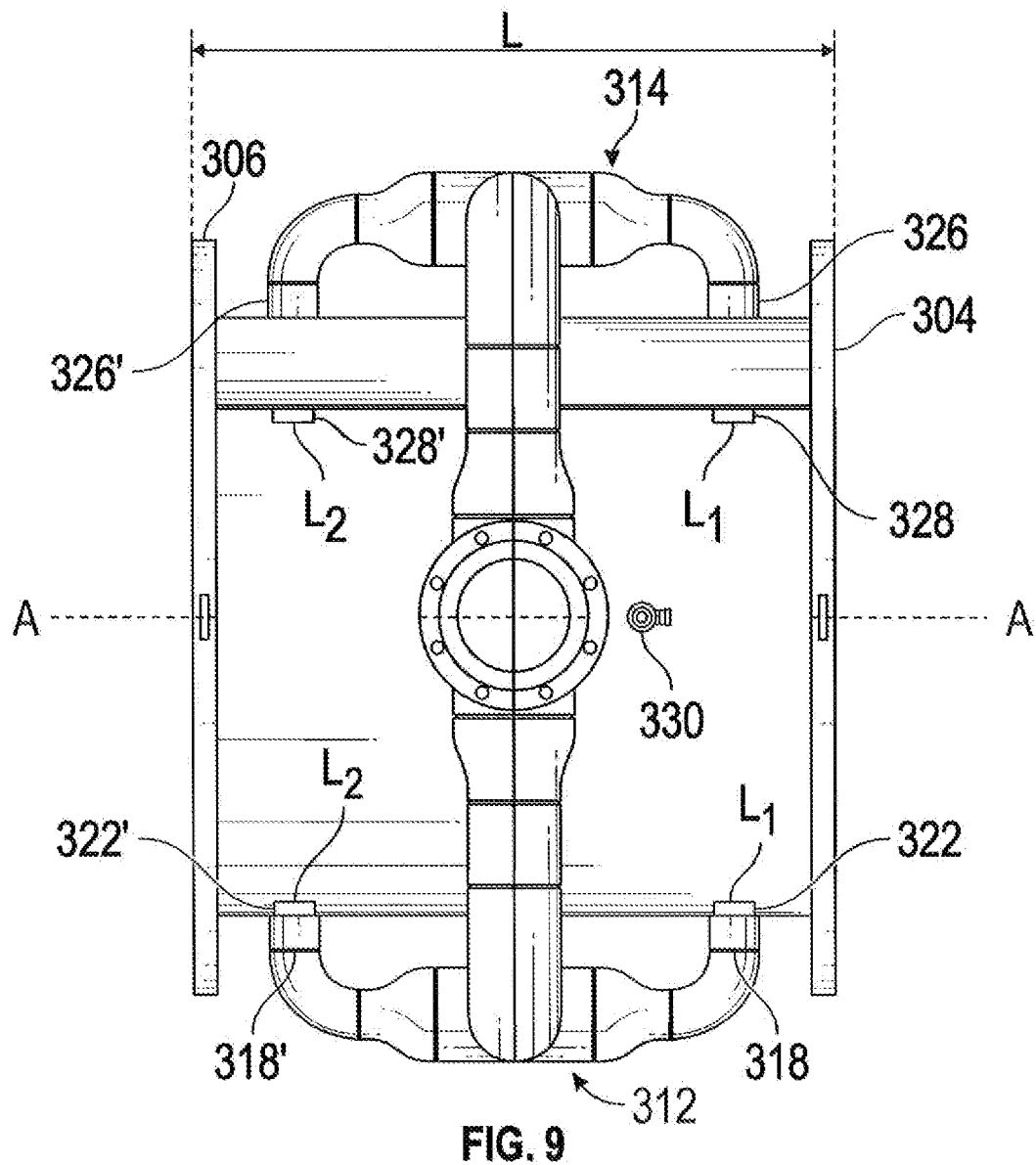
FIG. 9 depicts a top view of the embodiment depicted in FIG. 8.
Figure 10:
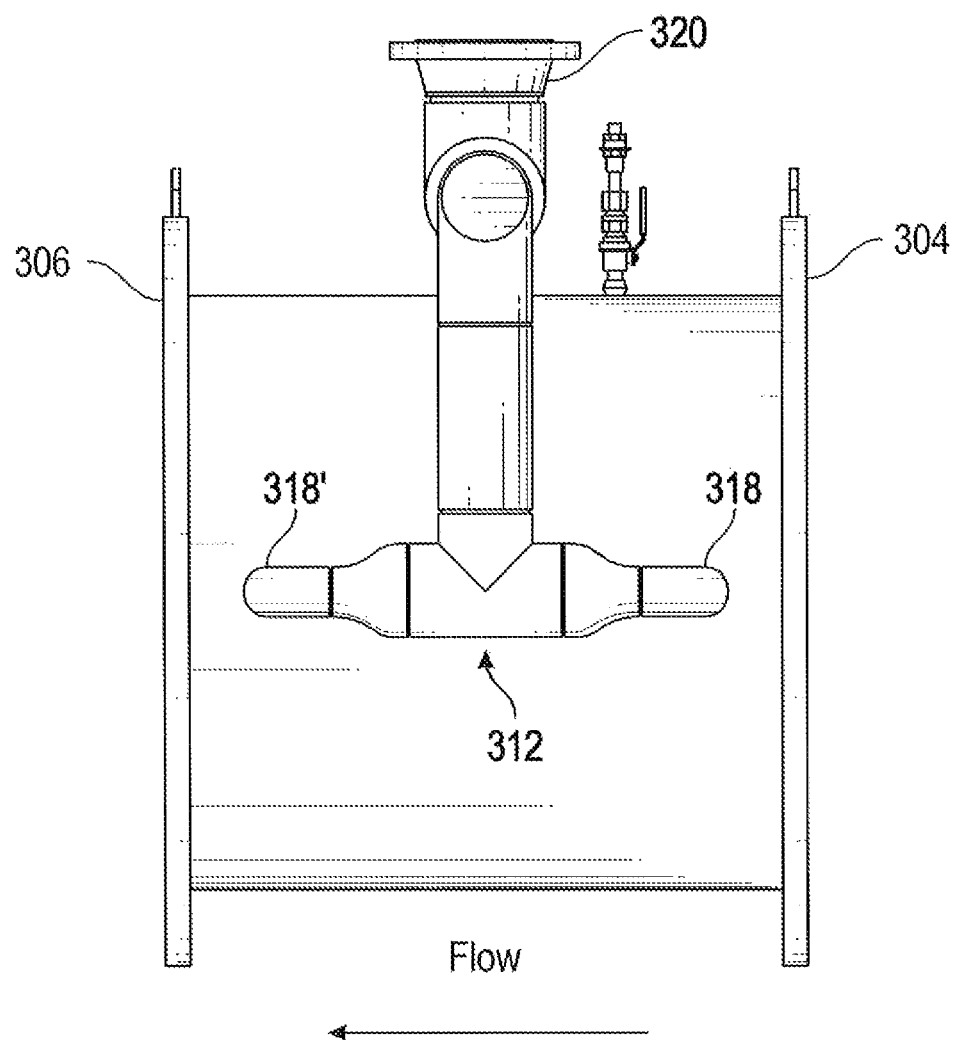
FIG. 10 depicts a side view of the embodiment of the mixing spool depicted in FIGS. 8-9.

FIGS. 8-10 depict another embodiment of a mixing spool 300. In this embodiment, mixing spool 300 has an integral conduit portion 302 which has a length L extending from an upstream end 304 to a downstream end 306, each end having a connecting structure, such as the flanges shown in the drawings, for connecting to adjacent conduit sections on either side. The integral conduit portion 302 has an inside wall 308.

Mixing spool 300 also comprises a piping structure which is external to the integral conduit portion 302. This piping structure comprises a manifold assembly 310. Manifold assembly 310 may comprise a first manifold 312 and a second manifold 314. The first manifold 312 has a proximate end 316, an upstream distal end 318, and a downstream distal end 318'. A central axis A is defined as a line extending through a center of the integral conduit portion 302. Proximate end 316 is connected to an inlet structure, such as tee 320.

Distal ends 318, 318' penetrate through inside wall 308 of the integral conduit portion 302. Distal end 318 comprises an upstream nozzle 322 which is disposed within an interior of the integral conduit portion 302. Distal end 318' comprises a downstream nozzle 322' which is likewise disposed within an interior of the integral conduit portion 302.

Similar to the first manifold 312, the second manifold 314 has a proximate end 324, an upstream distal end 326, and a downstream distal end 326'. Proximate end 324 is connected to the inlet structure, tee 320. Distal ends 326, 326' penetrate through inside wall 308 of the integral conduit portion 302. Distal end 326 comprises an upstream nozzle 328 also disposed within the interior of the integral conduit portion 302. Distal end 326' comprises a downstream nozzle 328' which is likewise disposed within an interior of the integral conduit portion 302.

Nozzle 322 and nozzle 328 are disposed at a first axial position $L_1$ along the length L of the integral conduit portion 302, with the nozzles set diametrically opposite each other. Nozzle 322' and nozzle 328' are disposed at a second axial position $L_2$ downstream from the axial position of nozzle 322 and 328 at $L_1$. The inlet structure, tee 320, is configured to receive a liquid flow and direct the flow to first manifold 312 and second manifold 314, each through which the flow is respectively directed to nozzles 322, 322', and nozzles 328 and 328'.

Mixing spool 300 further comprises a chemical injection quill 330. Chemical injection quill 330 has a shaft 332 which extends which extends through inside wall 308 of the integral conduit portion 302 which terminates at open end 334, through which a liquid additive may be released into the interior of the mixing spool 300. Open end 334 is disposed within the interior of the integral conduit portion 302 at a position between nozzle 322 and nozzle 328, where "between" is defined as being generally equidistant from the end of nozzle 322 and the end of nozzle 328 (i.e., shaft 332 having an axis which is perpendicular with center axis A of integral conduit portion 302). However, the radial position of open end 334 into the interior of the integral conduit portion 302 may vary. In addition, the axial position of open end 334 along length L may vary and may include a position at the same axial position, $L_1$, as nozzle 322 and nozzle 328, as well as positions downstream (i.e. toward downstream end 306) of $L_1$ including a position where open end 334 is at a downstream distance of 20 percent of the outside diameter from $L_1$ and a position where open end 334 is disposed at an axial position between nozzles 322, 328 and nozzles 322' and 328'.

The inventors herein have also discovered through modeling that the axial distance between upstream nozzles 322, 328 at the first axial position $L_1$ and the downstream nozzles 322', 328' at the second axial position $L_2$ can impact the mixing efficiency. The inventors herein have discovered that separating the upstream nozzles 322, 328 from the downstream nozzles 322', 328' by an axial distance ranging from 20 percent to 100 percent of the outside diameter of the conduit provides mixing efficiencies which are acceptable for various applications.

Embodiments of the apparatus described above may be utilized in a method of mixing a liquid coagulant into a flowing volume of water in a large diameter piping conduit (16 inches to 94 inches). An embodiment of the method comprises the steps of directing the flowing volume of water flowing through the pipe spool 10 which has been preinstalled as an integral component of the conduit. A pressured flow of water is delivered into an inlet, such as tee 120. The pressurized flow of water is directed from the inlet to the first upstream nozzle 122 and the second upstream nozzle 122. A liquid coagulant is injected into chemical injection quill 130, the chemical injection quill having an end which extends into the interior of the integral conduit portion and into the flowing volume of water, resulting in a treated flow of water with the end of the chemical injection quill disposed at a position between the first upstream nozzle end and the second upstream nozzle. The various structural components set forth above may be utilized in various embodiments of the method.

What is claimed is:

1. A method of mixing a liquid coagulant into a flowing volume of water in a piping conduit, the piping conduit having an outside diameter ranging from 16 inches to 94 inches, the method comprising the steps of:
   directing the flowing volume of water flowing through a pipe spool which has been preinstalled as an integral component of the piping conduit, the pipe spool comprising an integral conduit portion comprising a length extending between an upstream end and a downstream end, the pipe spool further comprising a first manifold comprising a first upstream distal end, the first upstream distal end comprising a first upstream nozzle which extends into an interior of the integral conduit portion, the pipe spool further comprising a second manifold comprising a second upstream distal end, the second upstream distal end comprising a second upstream nozzle which extends into the interior of the integral conduit portion, wherein the second upstream nozzle is disposed diametrically opposite the first upstream nozzle, wherein the first upstream nozzle and the second upstream nozzle are disposed at a first axial position along the length;
   delivering a pressurized flow of water into an inlet, wherein the pressurized flow of water is directed from the inlet to the first upstream nozzle and to the second upstream nozzle; and
   injecting the liquid coagulant into a chemical injection quill, the chemical injection quill having an end which extends into the interior of the integral conduit portion and into the flowing volume of water resulting in a treated flow of water, the end disposed at a position between the first upstream nozzle and the second upstream nozzle.

2. The method of claim 1 wherein the pipe spool comprises a plurality of trailing flow vanes disposed circumferentially about an inside wall of the integral conduit portion.

3. The method of claim 2 wherein the plurality of trailing flow vanes are disposed at an axial position downstream of the first axial position.

4. The method of claim 2 wherein the plurality of trailing flow vanes comprises six flow vanes, each flow vane having a base attached to the inside wall, each base attached at a sixty-degree circumferential interval from an adjacent base.

5. The method of claim 1 wherein the first upstream nozzle of the first upstream distal end and the second upstream nozzle of the second upstream distal end each penetrate into the interior of the integral conduit portion a distance ranging from ten percent to twenty-five percent of the outside diameter of the piping conduit.

6. The method of claim 1 wherein the first manifold upstream nozzle and the second manifold upstream nozzle each comprise an orifice diameter ranging from 1 inch to five inches.

7. The method of claim 1 wherein the end of the chemical injection quill is disposed at an axial downstream position ranging from ten percent to twenty percent of the outside diameter of the piping conduit from the first axial position.

8. The method of claim 1 wherein the first manifold comprises a first downstream distal end which extends through an inside wall of the integral conduit portion, the first downstream distal end comprising a first downstream nozzle, and the second manifold comprises a second downstream distal end which extends through the inside wall of the integral conduit portion, the second downstream distal end comprising a second downstream nozzle, wherein the second downstream nozzle is diametrically opposite the first downstream nozzle, wherein the first downstream nozzle and the second downstream nozzle are disposed at a second axial position along the length and the flow of the pressurized flow of water into the inlet is directed through the first upstream nozzle, through the second upstream nozzle, through the first downstream nozzle, and through the second downstream nozzle.

9. The method of claim 8 wherein the first axial position and the second axial position are separated by a distance ranging from 20 percent to 100 percent of the outside diameter of the piping conduit.

10. The method of claim 1 wherein the flowing volume of water has a first flow rate and the liquid coagulant is delivered into the chemical injection quill at a second flow rate, and the second flow rate ranges from 0.0003 percent to 0.01 percent of the first flow rate.

11. The method of claim 1 wherein an application of the method results in a uniformity index of the treated flow of water ranging from 0.70 to 0.95 within three seconds of the injection of the liquid coagulant into the flowing volume of water.

12. The method of claim 1 wherein an application of the method results in an incremental pressure drop not exceeding 0.50 psig.

13. The method of claim 1 wherein an application of the method results in a uniformity index of the treated flow of water ranging from 0.70 to 0.95 at a downstream distance from the chemical injection quill equivalent to three to four times the outside pipe diameter.

14. A method of mixing a liquid coagulant into a flowing volume of water in a piping conduit at a first flow rate, the piping conduit having an outside diameter ranging from 16 inches to 94 inches, the method comprising the steps of:
   directing the volume of water flowing through the piping conduit through a pipe spool which has been preinstalled as an integral component of the piping conduit, the pipe spool comprising a first nozzle which extends into an interior of the pipe spool and the pipe spool comprising a second nozzle which extends into the interior of the pipe spool, wherein the first nozzle and the second nozzle are in opposite facing relation;
   delivering a pressurized flow of water through the first nozzle and the second nozzle; and
   injecting the liquid coagulant into a chemical injection quill, at a second flow rate, the chemical injection quill comprising an end disposed between the first nozzle and the second nozzle, the chemical injection quill configured to deliver the liquid coagulant into the volume of water flowing resulting in a treated flow of water, wherein the second flow rate ranges from 0.0003 percent to 0.01 percent of the first flow rate.

15. The method of claim 14 wherein an application of the method results in a uniformity index of the treated flow of water ranging from 0.70 to 0.95 within three seconds of the injection of the liquid coagulant into the flowing volume of water.

16. The method of claim 14 wherein an application of the method results in a uniformity index of the treated flow of water ranging from 0.70 to 0.95 at a downstream distance from the chemical injection quill equivalent to three to four times the outside pipe diameter.

17. The method of claim 14 wherein an application of the method results in an incremental pressure drop in the conduit not exceeding 0.50 psig.

18. A method of mixing a liquid coagulant into a volume of water flowing through a piping conduit at a first flow rate, the piping conduit having an outside diameter ranging from 16 inches to 94 inches, the method comprising the steps of:
- diverting a portion of the volume of water flowing through the piping conduit into a manifold assembly, resulting in a mainstream flow of water in the piping conduit and a diversion flow of water in the manifold assembly;
- directing the mainstream flow of water in the piping conduit flowing in the piping conduit through a pipe spool which has been preinstalled as an integral component of the piping conduit, the pipe spool comprising a first nozzle which extends into an interior of the pipe spool and the pipe spool comprising a second nozzle which extends into the interior of the pipe spool, wherein the first nozzle and the second nozzle are in opposite facing relation;
- directing the diversion flow of water into the first nozzle and the second nozzle; and;
- injecting the liquid coagulant into a chemical injection quill, at a second flow rate, resulting in a treated flow of water, wherein the second flow rate ranges from 0.0003 percent to 0.01 percent of the first flow rate, the chemical injection quill having an end which extends into the interior of the pipe spool, the end disposed at a position between the first nozzle end and the second nozzle.

19. The method of claim 18 wherein the diversion flow of water comprises a second flow rate which is approximately five percent of the first flow rate.

20. The method of claim 18 wherein an application of the method results in a uniformity index of the treated flow of water ranging from 0.70 to 0.95 within three seconds of the injection of the liquid coagulant into the mainstream flow of water.

\* \* \* \* \*